United States Patent
Nothum, Sr. et al.

(10) Patent No.: US 6,305,274 B1
(45) Date of Patent: Oct. 23, 2001

(54) FRYER FOR FOOD PROCESS LINES

(76) Inventors: Robert G. Nothum, Sr., 2719 S. Catalina, Springfield, MO (US) 65804; Robert G. Nothum, Jr., 6356 W. State Hwy. O, Willard, MO (US) 65781

( * ) Notice: Subject to any disclaimer, the term of this patent is extended or adjusted under 35 U.S.C. 154(b) by 0 days.

(21) Appl. No.: 09/742,897

(22) Filed: Dec. 20, 2000

Related U.S. Application Data

(60) Provisional application No. 60/171,316, filed on Dec. 21, 1999.

(51) Int. Cl.$^7$ ............................. A47J 37/00; A47J 37/12
(52) U.S. Cl. ............................. 99/404; 99/330; 99/407; 99/408
(58) Field of Search ............................. 99/352–355, 330, 99/336, 337, 404–409, 403, 443 R, 443 C; 126/390–392; 426/511, 438, 523

(56) References Cited

U.S. PATENT DOCUMENTS

| | | | |
|---|---|---|---|
| 1,760,979 | * 6/1930 | Ferry | 99/405 |
| 2,546,163 | * 3/1951 | McBeth | 99/404 |
| 2,833,203 | * 5/1958 | Benson et al. | 99/404 |
| 3,309,981 | * 3/1967 | Benson et al. | 99/407 X |
| 3,376,806 | * 4/1968 | Magnusson | 99/408 |
| 3,635,149 | * 1/1972 | Smith et al. | 99/404 |
| 3,688,683 | * 9/1972 | Boggs | 99/330 |
| 3,757,672 | 9/1973 | Szabrak et al. | 99/404 |
| 4,187,771 | * 2/1980 | Westover et al. | 99/443 C |
| 4,478,140 | * 10/1984 | Bullock | 99/404 |
| 4,584,931 | * 4/1986 | Feehan | 99/355 X |
| 4,628,804 | * 12/1986 | Belshaw et al. | 99/409 X |
| 4,852,475 | * 8/1989 | Yang | 99/404 |
| 4,913,042 | * 4/1990 | Miller | 99/404 |
| 5,074,199 | 12/1991 | Miller | 99/404 |
| 5,253,567 | 10/1993 | Gunawardena | 99/404 |

* cited by examiner

Primary Examiner—Timothy F. Simone
(74) Attorney, Agent, or Firm—Johnathan A. Bay

(57) ABSTRACT

A hot oil fryer for continuous frying duty in continuous food process lines has a conveyor belt that has an upper food-carrying upper run and a lower return run. Heat input is provided by rectangular or square heat exchanger tubes that are placed directly underneath the food-carrying run in order to support it from sagging as well as cut-down the span between the source of heat flowing inside the heat exchanger tubes and the sink of heat in the food product that is transported on top of the conveyor's food-carrying run. The conveyor includes an entrant ramp section having at least high and low operative positions. The cooking channel at the intake end is provided with a series of gutters as well as sediment drains to afford collection and filtration of floating debris as well as sinking debris.

19 Claims, 9 Drawing Sheets

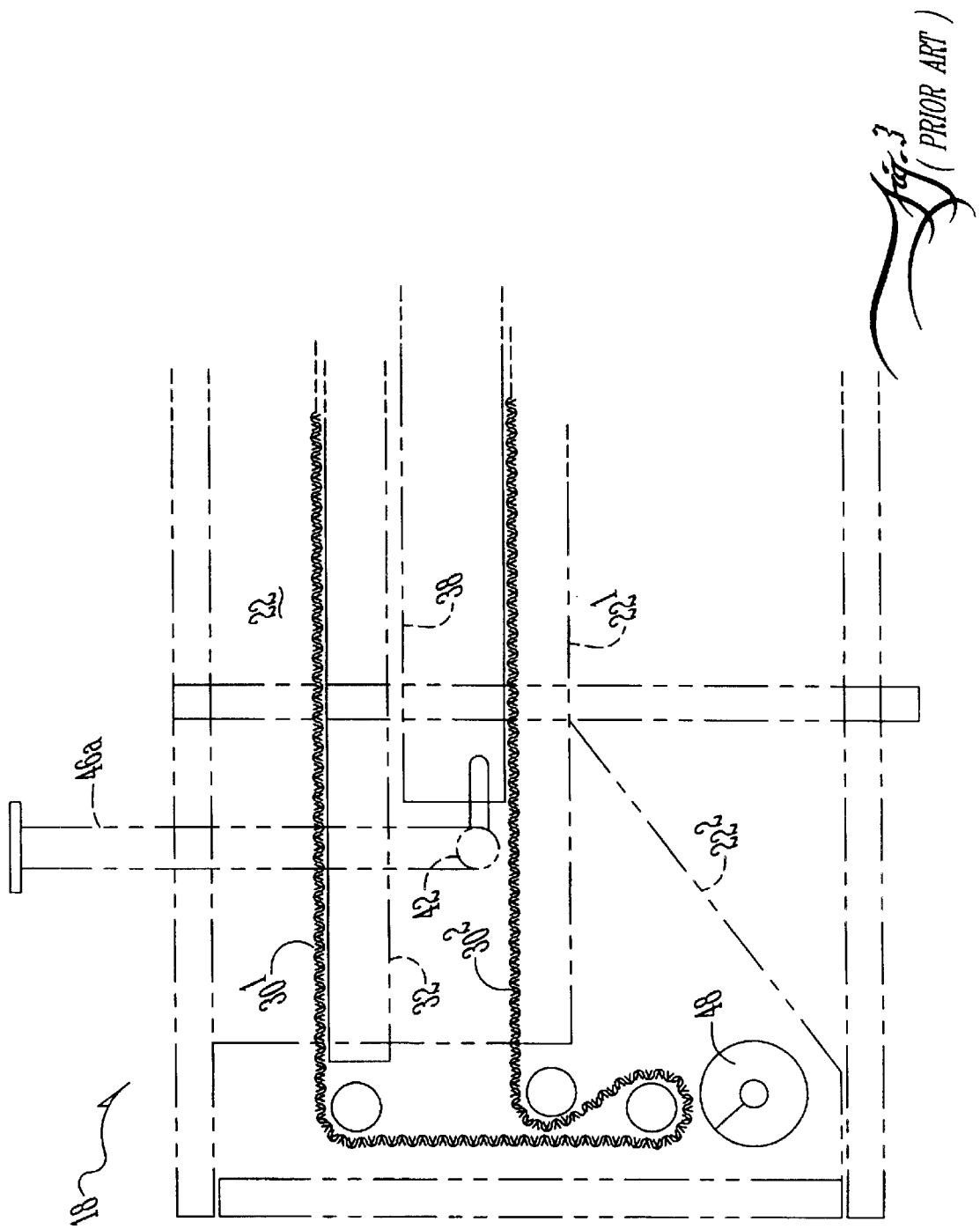

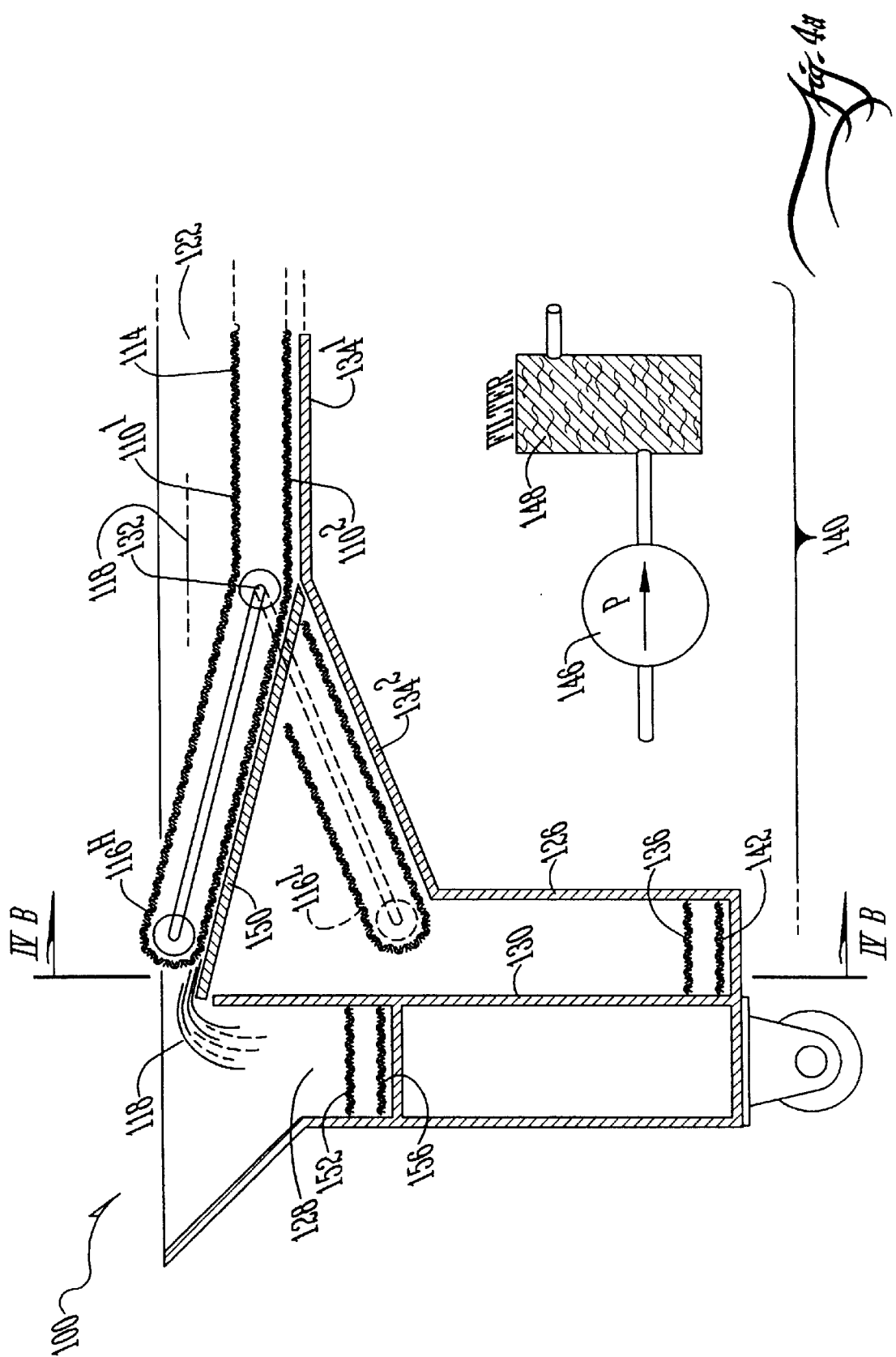

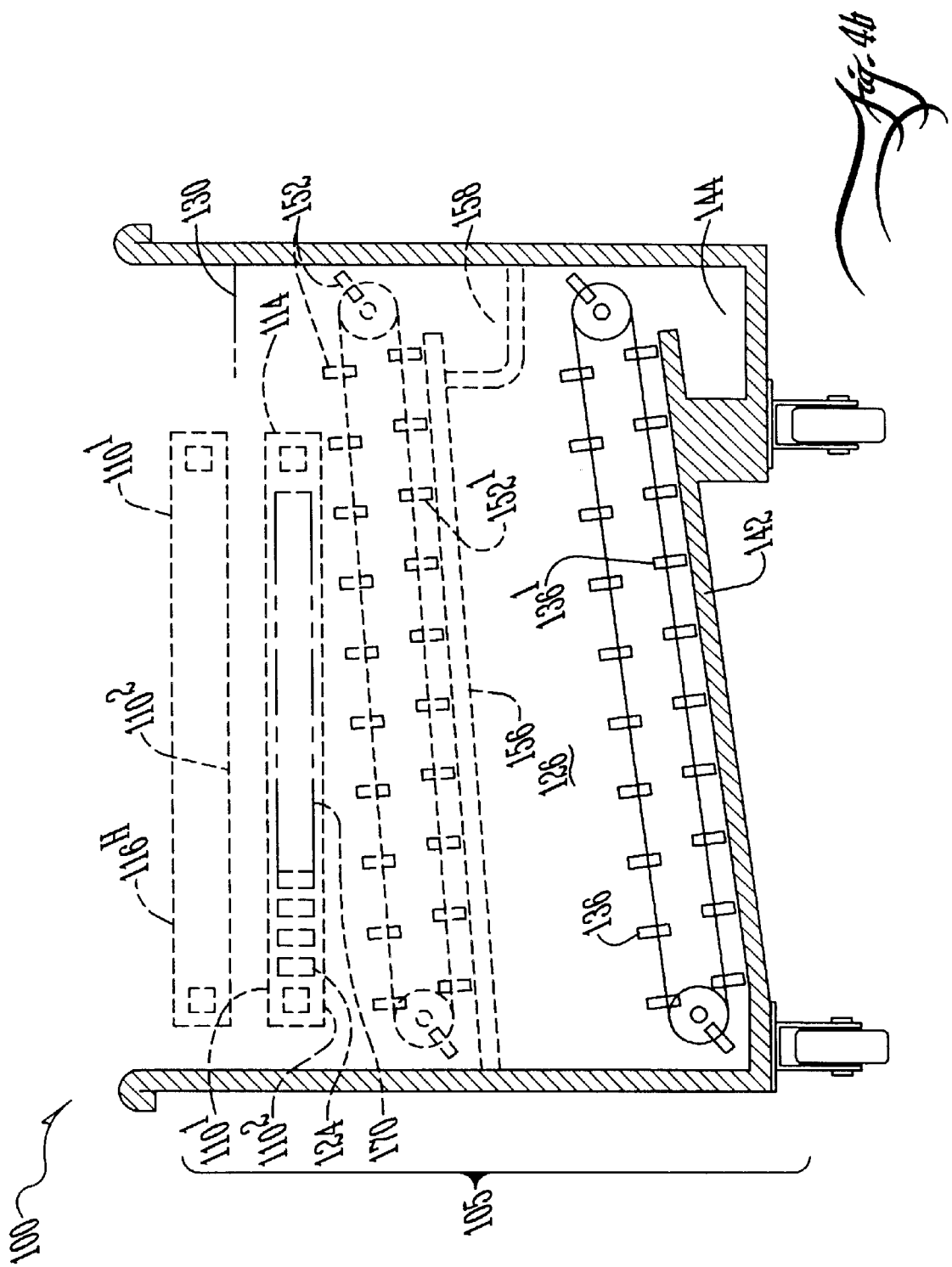

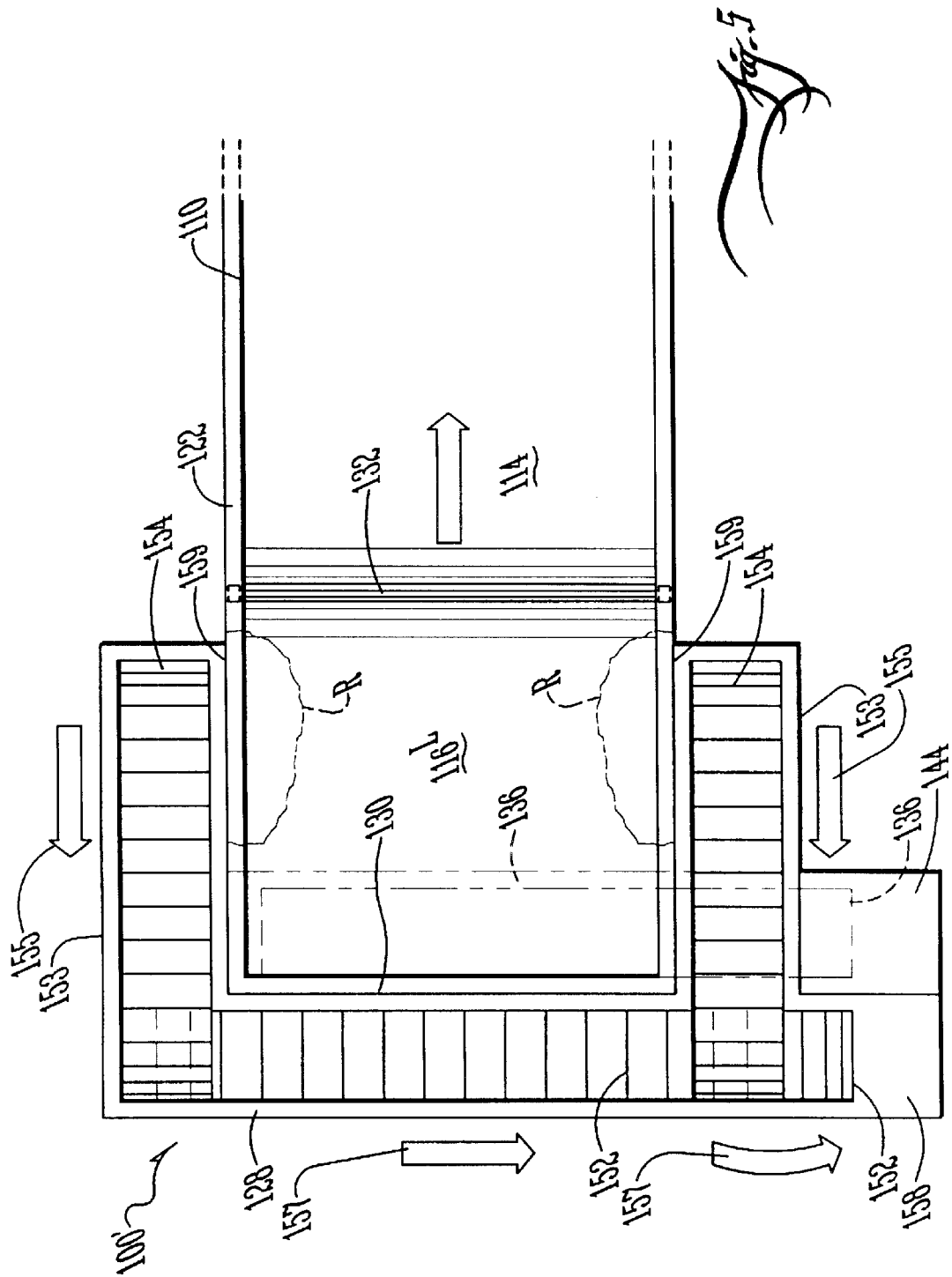

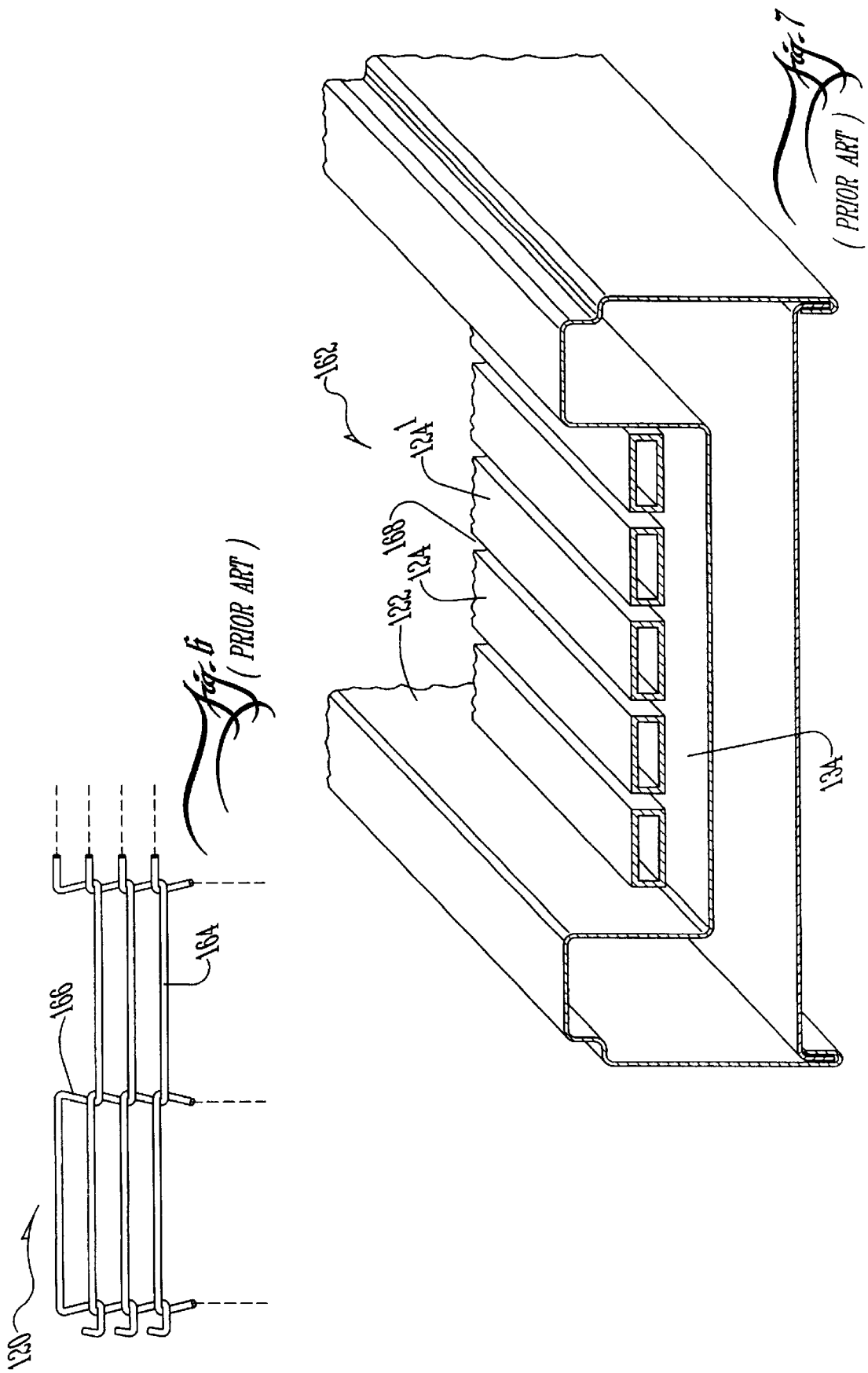

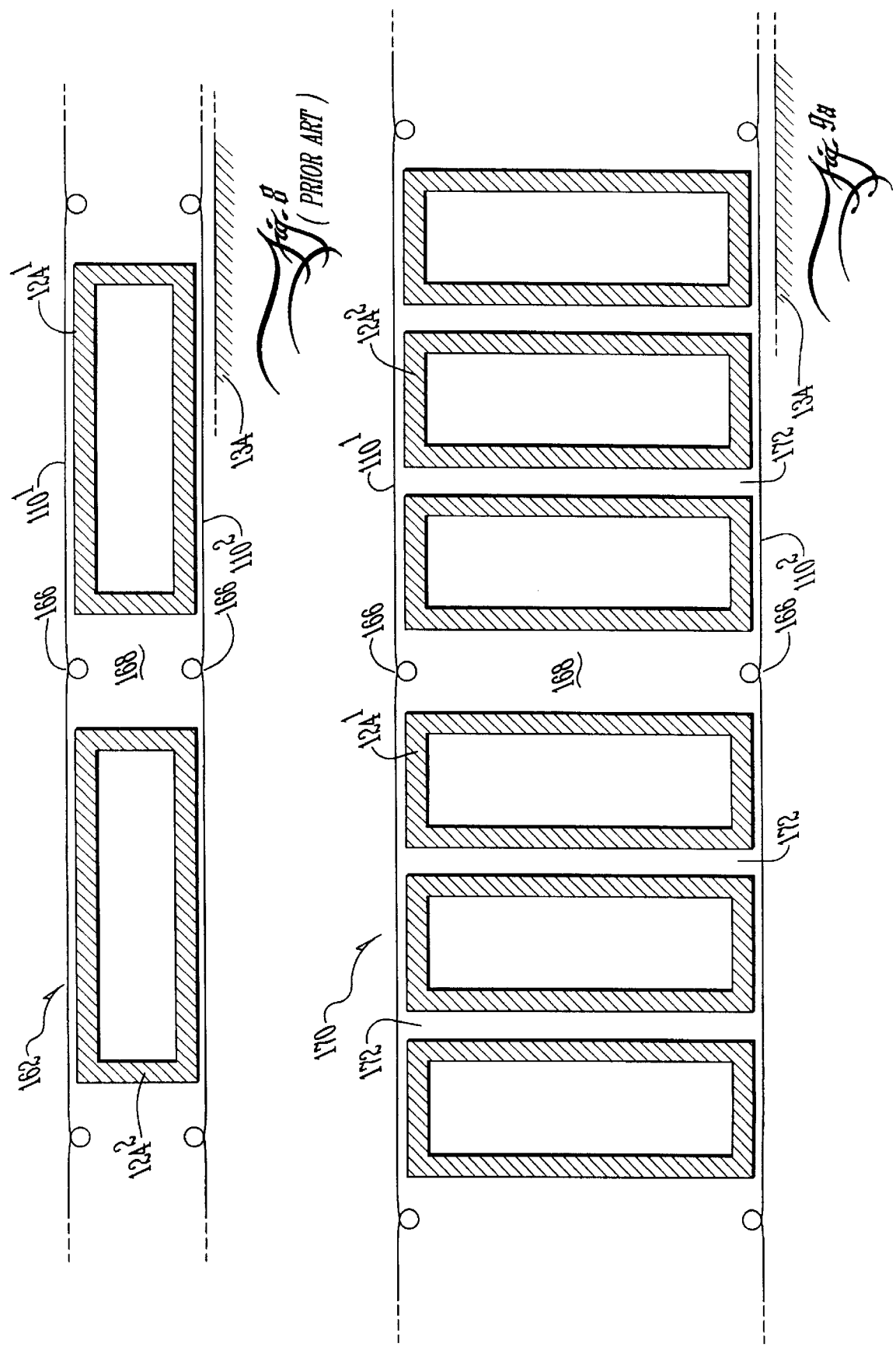

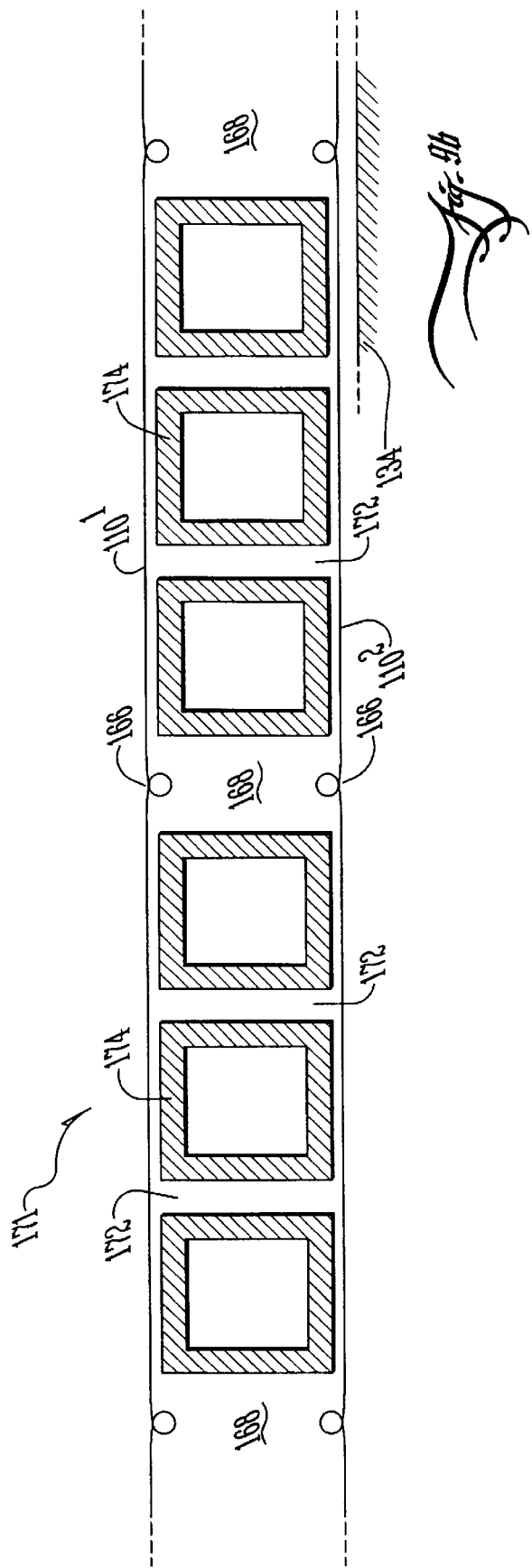

FRYER FOR FOOD PROCESS LINES

CROSS-REFERENCE TO PROVISIONAL APPLICATION(S)

This application claims the benefit of U.S. Provisional Application No. 60/171,316, filed Dec. 21, 1999.

BACKGROUND OF THE INVENTION

1. Field of the Invention

The invention generally relates to hot oil fryers for the continuous hot oil frying of large quantities of food products as in large scale food process lines. More particularly, the invention relates to improvements in sediment removal from the cooking oil, for extending the use life of the cooking oil; as well as, reduced height heat exchanger banks that permit a shallower oil level in the cooking channel, and hence reduce the quantity of cooking oil needed to fill the system. Additional aspects and objects of the invention will be apparent in connection with the discussion further below of preferred embodiments and examples.

2. Prior Art

FIG. 1 shows a representative deep fat fryer 18 in accordance with the prior art. It's for the continuous deep fat frying of large quantities of food product in a large scale food process line. The apparatus as generally shown by FIG. 1 is more particularly depicted and described in connection with U.S. Pat. No. 5,074,199—Miller, owned by Stein, Inc., of Sandusky, Ohio. That patent reference is incorporated herein by this reference to it. The vantage point of FIG. 1 is aimed at the discharge end of the fryer apparatus 18. Hence with reference to FIG. 1, the fryer apparatus 18 comprises a rigid unitary frame or housing 20. The frame 20 extends axially from the discharge end to the infeed end of the apparatus 18, and extends vertically up from the floor to the level of apron members 21. The apron members 21 are directly secured to the top of the frame 20 and are connected in a unitary manner with a lining which forms an elongated horizontal oil tank or "cooking channel" 22.

The cooking channel 22 is defined by front and rear walls, spaced side walls and a bottom wall (eg., the bottom wall is indicated as $22^1$ in FIG. 3). FIG. 7 gives another view of a cooking channel. The cooking channel will hold a volume of cooking liquid or oil (eg., or sometimes else known as "fat," as in "deep 'fat' frying"). The frame 20 includes feet 20a.

Mounted near the four corners of the fryer apparatus 18 are four upright jacks 23. The jacks 23 are preferably hydraulic and likely incorporate vertically extending piston rods 23a. The piston rods 23a are connected at their upper ends to respective cross bars 24a and 24b. Wherein, cross bar 24a is near the infeed end of the apparatus (ie., the far end in FIG. 1) and cross bar 24b is near the discharge end (ie, the near end in FIG. 1). Mounted above these cross bars 24a and 24b is an elongated hood or cover 25. The hood or cover 25 has a rectangular recess or opening 25a at its lower side which makes a generally close fit with the aprons 21 when the apparatus 18 is in its nested or "closed" position for a cooking operation as illustrated in FIG. 2. The hood 25 may be provided with exhausts or vents (not shown) for exhausting gases or venting steam produced in association with the frying operation.

The fryer 18 includes a pair of cooperating conveyors 26 and 30, wherein the overhead conveyor 26 is a "submerger" conveyor and the underneath conveyor 30 is the main tractor or food-carrying conveyor. Frying food product (not shown) is transported through the cooking channel 22 compressed between these two conveyors 26 and 30.

The submerger conveyor 26 has spaced parallel outer side rails 26a. It is suspended as shown in FIG. 1 by its outer side rails 26a hanging on a set of four (4) relatively short chains 27. One pair of the chains 27 is connected to the cross bar 24a at the infeed end of the fryer 18, and the other pair of the chains 27 is connected to the cross bar 24b at the discharge end. The main tractor or food-carrying conveyor 30 has spaced parallel outer side rails 30a, and it is suspended by its outer side rails 30a hanging from a set of four (4) relatively longer chains 31. A pair of these relatively longer chains 31 is connected with the cross bar 24a near the infeed end of the fryer 18 as the two other of the relatively longer chains 31 are connected with the cross bar 24b near the discharge end of the fryer.

Reference may be had to an early U.S. Pat. No. 3,757,672—Szabrak et al., for a more detailed discussion of the fryer 18's construction and operation, which patent reference of Szabrak, et al., is also incorporated herein by this reference to it. Basically, main tractor conveyor has an upper, food-carrying run $30^1$ (as well as a lower return run $30^2$). The submerger conveyor 26 has a lower, food-submerging run $26^1$ (in addition to its upper return run $26^2$). In use, the upper or food-carrying run $30^1$ of the main tractor conveyor 30 supports the food product during transport through the cooking channel 22 concurrently as the lower or food-submerging run $26^1$ of the submerger conveyor 26 presses the food product down sufficiently to keep it from floating off.

To maintain compression between the food-carrying run $30^1$ and the food-submerging run $26^1$ of conveyors 30 and 26, respectively, requires reinforcement being given to both runs $30^1$ and $26^1$. FIG. 2 shows that the opposed runs $30^1$ and $26^1$ are oppositely reinforced. That is, the food-carrying run $30^1$ is reinforced by a beds of rollers 32 whereas the food-submerging run $26^1$ is reinforced by a ceiling of like rollers.

FIG. 1 shows the fryer 18 in an open position. The side rails 30a of the main conveyor 30 are hoisted up well above and out of the hot bath of oil in the cooking channel 22. The side rails 26a of the submerger conveyor 26 are hoisted up even higher, as over the main conveyor 30. The hood 25 is shown disposed elevated even above the submerger conveyor rails 26a. This open position of the fryer 18 as shown by FIG. 1 allows the manual clearing of food product blockage from the conveyors, or more generally, the open position facilitates inspection, cleaning and maintenance.

FIGS. 2 and 3 do not strictly depict the same fryer configuration 18 as shown by FIG. 1. More particularly, the fryer 18' of FIGS. 2 and 3 is adapted from a pair of patent references which are commonly owned by Stein, Inc., consisting of not only the aforementioned U.S. Pat. Nos. 5,074,199—Miller, but also 5,253,567—Gunawardena, which latter patent reference is likewise incorporated by this reference to it.

The predominant distinction between the FIG. 1 fryer 18 and the FIGS. 2,3 fryer 18' relates to location of the heat exchanger units 36,38 relative to the main tractor conveyor 30. In FIG. 1, the heat exchanger units 36,38 are situated completely below both runs $30^1$ and $30^2$ of the main tractor conveyor 30. In FIGS. 2 and 3, the heat exchanger units 36,38 are situated between the two runs $30^1$ and $30^2$ of the main tractor conveyor 30. Indeed, in FIGS. 2 and 3, the lower or return run $30^2$ scrapes along the bottom $22^1$ wall of the cooking channel 22.

With more particular reference to FIGS. 2 and 3, the fryer apparatus 18' includes fore and aft heat exchanger units or "banks" 36 and 38 of what are known as indirect-fired type heat exchangers. Unlike direct-fired types (wherein the heat exchangers are actually flues venting the combustion gases of a combustion source), indirect-fired heat exchangers circulate a recycled hot medium that is heated by a remote combustion or heat source 44. Preferably the circulating hot medium is another oil or else steam:—oil is probably more common because it is less difficult to manage than steam.

The forward heat exchanger bank 36 occupies the front or infeed half of the cooking channel 22 as the aft bank 38 is situated in the rear or discharge half of the cooking channel 22. The heat exchanger banks 36 and 38 are adapted for heating the bath of cooking oil or fat within the cooking channel 22 to a desired temperature (eg., ~400° F.–500° F.). In use, the heat exchange units 36 and 38 are submerged in the deep fat bath of the fryer.

Each heat exchange bank or unit 36 or 38 comprises a plurality of vertically oriented heat transfer "plates" 40. Although, these "plates" 40 are actually vessels that have hollow cores which define a flow channel therein. As shown by FIGS. 2 and 3, the bank or banks of heat exchangers 36,38 are positioned below the roller bed 32 of the main food carrying run $30^1$ of the main conveyor 30, and above the return run $30^2$ thereof. Each heat-exchanger bank 36,38 has an inlet manifold 42 and inlet piping 44a on one extremity and an outlet manifold 42 and outlet piping 46a at its opposing extremity. The inlet and outlet manifolds 42 are coupled to each of the heat exchanger plates 40 to uniformly introduce the re-circulating hot medium to each.

The design of the heat-exchanger "plates" 40 can partly be reckoned from inspection of FIG. 2. No doubt, the design of the heat-exchanger "plates" 40 is more particularly described and depicted in the aforementioned patent reference of Gunawardena. But with reference to FIG. 2, each heat exchanger plate 40 typically comprises at least two sheets of stainless which are secured together to form a pressurized vessel. The opposite sheets may be "dimpled" together in places by tack weld or, that is, employ a double embossed design which has inflated zones on both sides. In this manner, a plurality of pockets are formed such that the core or flow passage in any given plate-like vessel 40 causes the circulating hot medium to split into separate tendrils, which tendrils are directed to braid and intertwine with one another through the course of the flow passage. The sheets are sealed by welding about their edges to form such a hollow "plate"40.

The heat-exchanger plates 40 are generally vertically oriented on edge and spaced laterally across the width of the cooking channel 22. Also, the plates 40 are connected at each end by the inlet manifold 42/44a and exit manifold 42/46a, respectively. The vertical, on-edge orientation of the plates 40 and the spacing therebetween permits bread crumbs or food particles to fall through. That is, bread crumbs or other sediment which falls through the food-carrying run $30^1$ as well as the bed of rollers 32, ought to get clearance between the vertical plates 40 to land on the bottom wall $22^1$ of the cooking channel 22. The return run $30^2$ of the main conveyor 30 will motivate or push such sediment along the bottom wall $22^1$ of the cooking channel 22 (see, eg., FIG. 3) with the intention that such sediment will ultimately be removed from the oil system by a sediment-discharge auger 48.

FIG. 3 shows diagrammatically that the return or sediment-transporting run $30^2$ of the main food conveyor 30 indeed travels fairly closely along the bottom wall $22^1$ of the cooking channel 22. Hence the return or sediment-transporting run $30^2$ catches and facilitates removal of sediments comprising food particles which have fallen from food products on the main food-carrying run $30^1$ and sunk to the bottom $22^1$ of the cooking channel 22. These types of sediment materials are removed from the fryer 18' by means of the sediment-carrying run $30^2$ pushing the sediment along the bottom $22^1$ of the cooking channel 22 until the cooking channel 22 opens into a sediment-removal well $22^2$. The sediment-removal well $22^2$ is positioned at the discharge end of the return or sediment-transporting run $30^2$. The sediment-removal well 22 has a deep end which is occupied by the discharge auger 48.

The main food conveyor 30—including its main food-carrying run $30^1$ and sediment-transporting return run $30^2$—is typically formed from an endless conveyor belt constructed of a wire mesh, as shown by for example, FIG. 6. Such a wire mesh belt is driven by conventional means such as a chain drive or hydraulic system and the like.

The fryer 18 is likely provided with sensors associated with the housing 20 and/or hood member 25, which in conjunction with an electronic control system (not shown) will indicate whether the hood 25 is in a closed position to enable operation of the apparatus, or whether hood 25 is opened which will render the apparatus inoperative for safety purposes. Other sensors (not shown) associated with the apparatus 18 may include a low oil level sensor and temperature sensors to allow precise control of temperature of the cooking oil throughout the cooking cycle within the apparatus 18. Additional safety features associated with the apparatus 18 may comprise high temperature cutoff or limiting switches flame sensors or the like which will automatically shut down operation of the apparatus upon the occurrence of unsafe conditions in its operation. An electronic control system may be used to control all of the various aspects of operation of the fryer apparatus accordingly.

Shortcomings with prior art fryer apparatus relate to the excessive volume of cooking oil required to charge the oil system at one time, as well as to sediment removal. It is desirable to minimize the charge or volume of cooking oil needed to keep the fryer in service during use, as much as practicable. In other words, it is desirable to get by on as low of cooking oil volume as practicable. The prior art design of the heat exchanger plates 40 has the flattened plate-like pressure vessels sitting on edge to present a relatively tall aspect that must be all submerged by cooking oil. And then, at an elevation above the heat exchangers, an intervening bed of rollers which support the food-carrying run from sagging spread out the distance between the source of heat (ie., the heat exchangers) and the sink of heat (ie., the food product transiting on the food-carrying run of the conveyor). Cooking oil must be poured into the channel to support this intervening bed of support rollers too.

Minimizing cooling oil volume is important for large scale food processing applications for a variety of reasons. With a low volume of cooking oil, it is easier to keep the cooking oil in circulation. Sediments might be more efficiently strained and filtered out of the cooking oil. Also, poor oil circulation within the fryer tank and/or cooking channel creates hot spots which affords decomposition of the oil, and/or rises in the free fatty acids. Un-removed sediments which char in the hot oil contribute further to decomposition of the oil, with a greater likelihood of unpleasant tasting food products. Once that happens, the cooking oil must be changed out, with the old oil being discarded. The replacement of the cooking oil is one cost users of frying apparatus would like to minimize because simply, the cost of replacement cooking can add up and be significant over time. Just as importantly, users would like to avoid or minimize the down time that the whole food process line suffers because of the hold-up associated with a change-out of the cooking oil in the fryer.

What is needed is an improvement which overcomes the shortcomings of the prior art.

SUMMARY OF THE INVENTION

It is an object of the invention to provide a hot oil fryer for continuous frying duty in continuous food process lines which has a compact oil bath for getting by operating with a reduced volume of cooking oil.

It is an alternate object of the invention that the above hot oil fryer have an entrant ramp section that is operative alternatively between at a high and low position.

It is another object of the invention that the above hot oil fryer have various sediment drains as well as gutters to improve the collection and ultimate filtration of not only sinking debris but also floating debris.

These and other aspects and objects are provided according to the invention in a hot oil fryer for continuous frying duty in continuous food process lines. The fryer includes a cooking channel having a bottom wall between spaced sidewalls and spaced end walls for containing cooking oil to a given fill level. The fryer also has a conveyor belt which has an upper food-carrying run and a lower sediment-motivating run. The lower sediment-motivating run is disposed to traverse along the cooking channel bottom wall for motivating sediment in direction of an intake end of the cooking channel. Otherwise the conveyor belt is disposed in the cooking channel such that a majority of both runs can be sunk below the given fill level of the cooking oil.

The fryer moreover includes a bed of rectangular or square heat exchanger tubes arranged in spaced rows that extend parallel to the runs of the conveyor. In the cases of rectangular tubes, each is disposed upright with the narrow sides being top and bottom and the broad sides being vertical. This bed of heat exchanger tubes is interposed between the conveyor belt's upper and lower runs such that the top sides of the tubes cooperatively support the upper food-carrying run against sagging and also cut-down the span between the source of heat flowing inside the heat exchanger tubes and the sink of heat in the food product that is transported on the food-carrying run. A heat input system is provided for servicing the heat exchanger tubes with a heat medium.

The conveyor belt likely comprises an open mesh design having a pattern that presents a series of spaced seams. If so, the heat exchanger tubes are sized and arranged in the bed such that some gaps between adjacent tubes accommodate the sliding transit of the seams therealong as other gaps do not and thereby afford clearance for sediment sinking from the upper food-carrying run to the lower sediment-motivating run.

The fryer is likely provided with a cooking oil filtration system which interfaces with the cooking channel at least by an intake associated with the cooking channel's intake end.

The fryer preferably includes a submerger system disposed directly above the conveyor belt's food-carrying run in order to submerge food product below the given fill level of the cooking oil during transit through the cooking channel. Needless to say, there is also a drive input system for driving the conveyor.

Another optional aspect of the fryer pertains to the cooking channel having its bottom wall deepening at the intake end to define a pair of debris collection wells which are partitioned by a transverse wall into an inboard debris collection well and an outboard debris collection well. The conveyor correspondingly includes an entrant ramp section that is operative in the intake end's inboard debris collection well at least alternatively between a high-ramp configuration a low-ramp configuration. That way, the lower sediment-motivating run of the entrant ramp section motivates debris into the outboard well if in the high-ramp configuration or else into the inboard well if in the low-ramp position.

More particularly, the way in which the lower sediment-motivating run of the entrant ramp section motivates debris into the outboard well if in the high-ramp configuration includes the following. That is, the fryer includes a convertible incline panel. The convertible incline panel is removable underneath the entrant section's lower sediment-motivating run when it is in the high-ramp configuration. When installed, the convertible incline panel extends from an origin about where the cooking channel deepens to a termination in or over the outboard debris collection well. This convertible incline panel provides support against sagging to the entrant section's lower sediment-motivating run as well as affords the sliding transit of sediment thereacross until ejected over the termination that is in or over the outboard debris collection well.

Another aspect of the fryer pertains to the sidewalls of the cooking channel where flanking the inboard debris collection well are formed low, or as low as about even with the given fill level of the cooking oil. The low sections of the sidewalls are thus provided with gutters that afford the spillover and removal of floating debris, or presumptively floating debris. Preferably these gutters drain into the outboard debris collection well. The outboard debris collection well may be itself no more than a gutter attached to the transverse partition wall's upper edge.

About that transverse partition wall, preferably it has an upper edge that generally corresponds to the given fill level of the cooking oil. In the matters of the cooking oil filtration system, it likely interfaces with at least the inboard and outboard debris collection wells, and perhaps the gutters too.

Additional aspects and objects of the invention will be apparent in connection with the discussion further below of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 3 is an enlarged-scale, diagrammatic side elevational view generally corresponding to the prior art fryer of FIG. 2;

FIG. 4a is an axial, vertical section view of a fryer in accordance with the invention for large scale food process lines, with portions broken away;

FIG. 4b is a diagrammatic section view taken along line IVB—IVB in FIG. 4a, with portions shown in phantom line;

FIG. 5 is a top plan view of an alternate embodiment of the fryer in accordance with the invention for large scale food process lines, with portions broken away FIG. 6 is a top plan view of a wire mesh conveyor belt of the prior art;

FIG. 7 is a perspective view of a heat exchanger arrangement in accordance with the prior art, disposed in a fryer cooking channel;

FIG. 8 is an enlarged-scale transverse section view of the FIG. 7 heat exchanger arrangement in accordance with the prior art, with a belt included to depict its position with the heat exchanger tubes;

FIG. 9a is a transverse section view comparable to FIG. 8 except showing the heat exchanger tubes arranged in accordance with the invention; and, FIG. 9b is a transverse section view comparable to FIG. 9a except showing an alternate arrangement of heat exchanger tubes in accordance with the invention.

DETAILED DESCRIPTION OF THE PREFERRED EMBODIMENTS

FIGS. 4a and 4b show an inventive fryer 100 configured with a sediment removal system 105 in accordance with the invention. The fryer 100 has a main food-carrying conveyor 110 which can take the form of, for example and without limitation, a wire mesh belt 120 as shown by FIG. 6. Staying in FIG. 4a, the main food conveyor 110 has an upper food-carrying run $110^1$ and a lower, sediment-transporting run $110^2$.

Figure 1:
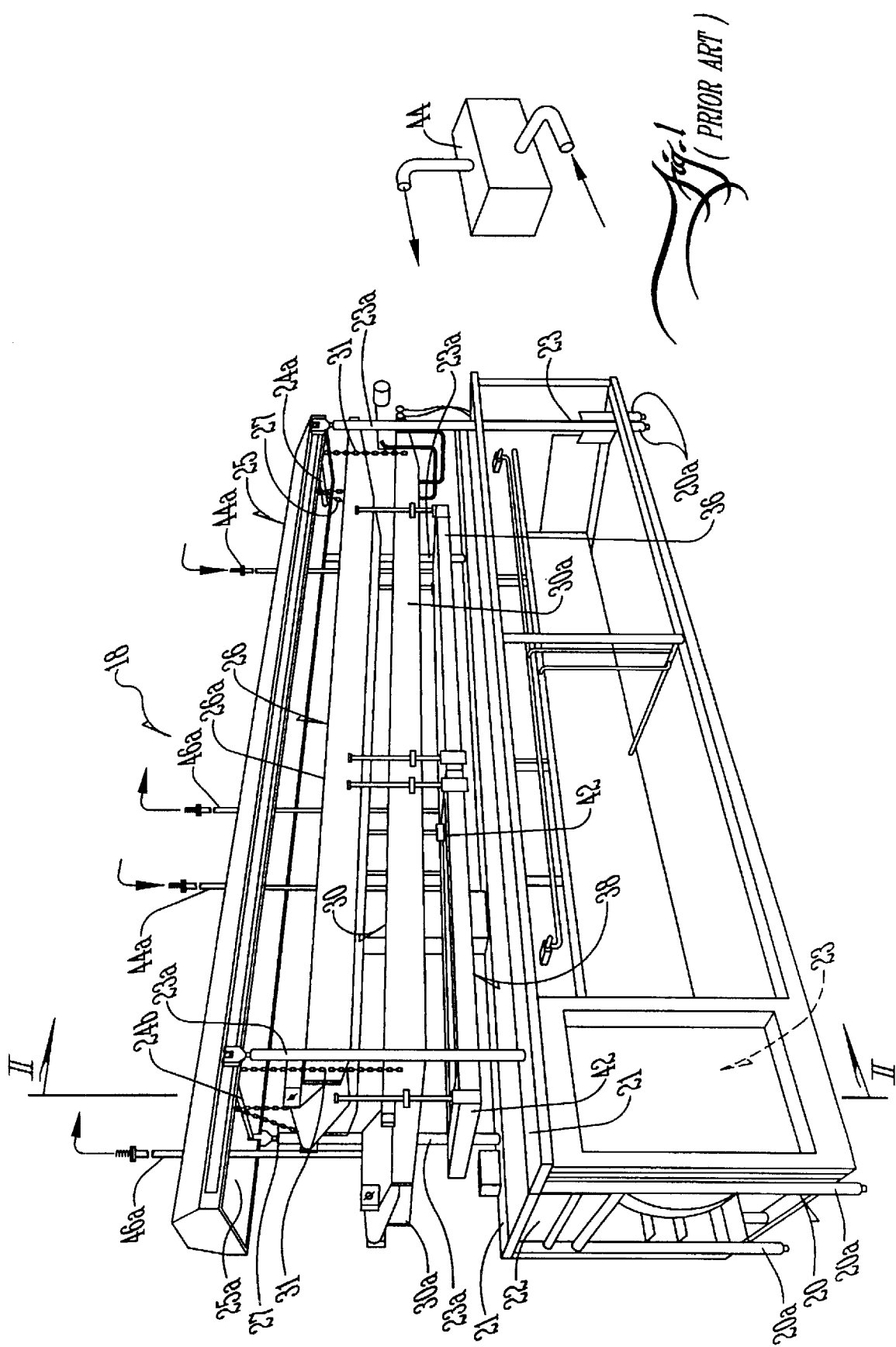
FIG. 1 is a perspective view of a deep fat fryer of the prior art.
Figure 2:
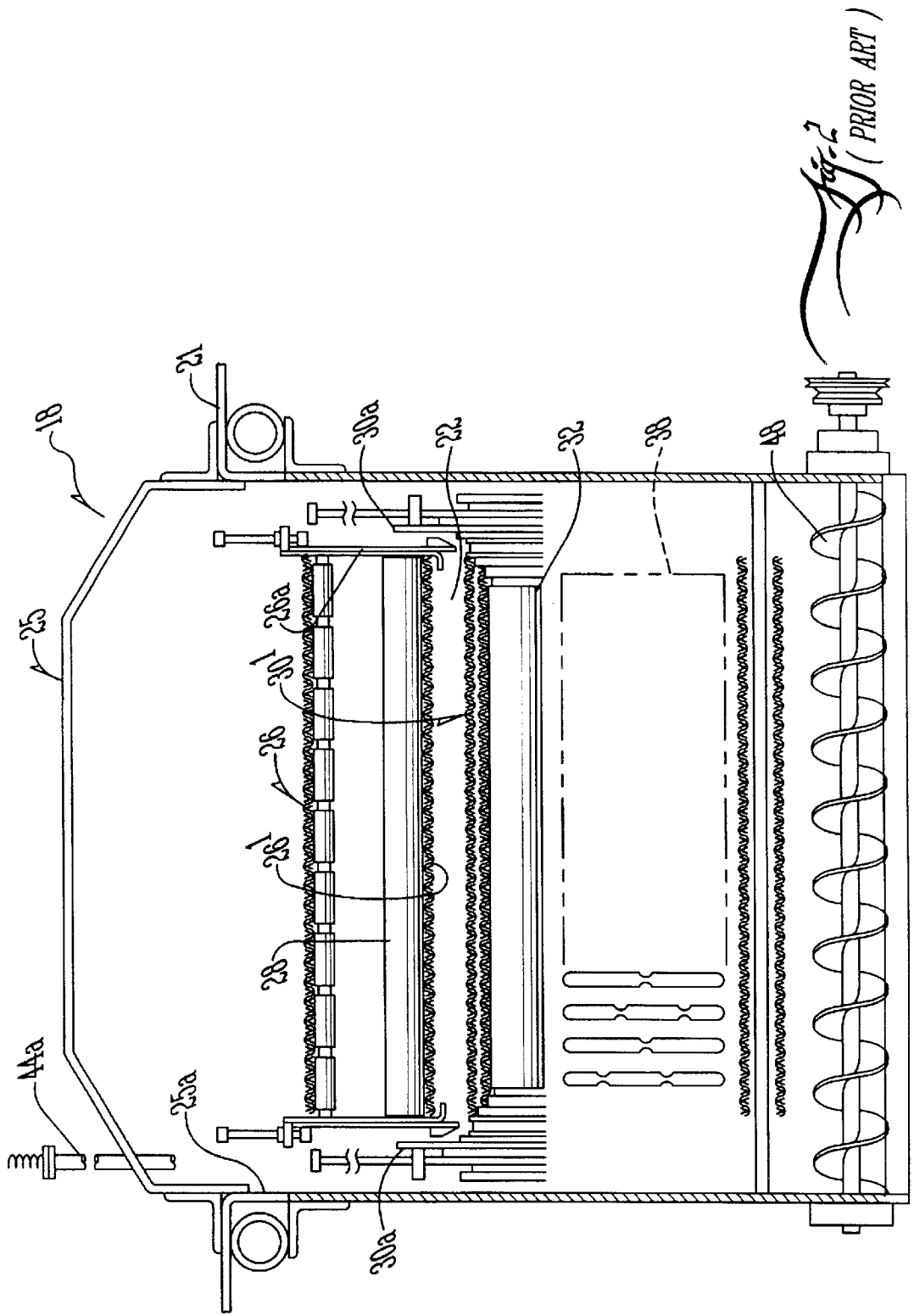
FIG. 2 is an enlarged scale, partially broken, section view taken along the line II—II in FIG. 1, except including modifications also known from the prior art.

FIG. 4a shows the intake end of the fryer 100, which is where food product enters the fryer 100. The main food conveyor 110 has a central level section 114 and an entrant ramp section 116 that is adjustable relative to the main level section 114 between a high extreme (one high position is indicated as $116^H$ and shown in solid lines), and, a low extreme (a low position is indicated as $116^L$ and shown in dashed lines). The various high and low positions afford multiple features advantageous for the intake of diverse food products. For example, the high ramp position $116^H$ is preferred for the intake of various breaded products, which preferably ride down the decline of the high ramp $116^H$, to level out on the main level section 114. The low ramp position $116^L$ is preferred for battered products, which are preferably dropped into the oil bath (eg., a given oil level indicated as 118) before eventually being fished out and elevated up the incline of the low ramp $116^L$, to climb to the plane of the main level section. In use, the food product is kept submerged on the main conveyor 110 by a submerger conveyor (not shown, but see FIGS. 1 or 2 for illustration of a submerger conveyor).

The fryer 100 defines a main cooking channel 122. The cooking channel 122 is filled with cooking oil (eg., 118) that is heated by heat exchangers 124 (that will be more particularly described below in connection with FIG. 9a). The cooking channel 122 opens up into an inboard intake-end well 126 which serves for, among other purposes, sediment removal. The inboard intake-end well 126 is set apart from an outboard intake-end well 128 by a partition 130. The partition 130 is distanced from the pivot axis 132 of the main food conveyor 100's ramp section 116 such that the ramp section 116 can flap among the extreme high and low positions $116^H$ and $116^L$ without swiping into the partition 130.

The cooking channel 122 has a bottom wall 134 which includes a level section $134^1$ on which the return run $110^2$ of the main food conveyor 10 scrapes. The return run $110^2$ transports sediment right to left in FIG. 4a, or towards the sediment-removal well(s) 126/128. The cooking channel 122 bottom wall 134 further includes a fixed decline section $134^2$ that slopes down into the depths of the inboard sediment well 126. When the ramp section $116^L$ is in its low position, the return run scrapes $110^2$ along this decline section $134^2$. At the end of the decline section $134^2$, the return run $110^2$ ejects its sediment load into the inboard sediment well 126. The heavier-than-oil content of the sediment load is free to drift down onto an inboard flight conveyor 136. FIG. 4b shows that the inboard flight conveyor 136 has a scrape run $136^1$ scraping over a bottom 142 for the inboard well 126. The scrape run $136^1$ of the inboard flight conveyor 136 pushes its load into an inboard sump 144.

The construction and operative principles of flight conveyors are more particularly disclosed by commonly-owned, commonly-invented U.S. Pat. No. 5,937,744—Nothum et al., which is incorporated herein by this reference to it.

The fryer 100 includes a cooking oil system 140 as follows. The cooking oil 118 is in continuous circulation not only by eddying within the cooking channel 122, but also by being suctioned out through a drain in the sump 144 by a pump 146, which discharges to a filter 148. That way, sediment in the cooking oil 118 can be strained and/or filtered out. After filtration, the cooking oil 118 is re-circulated back into the fryer 100

An inventive aspect of this fryer 100 relates to the intake-end, outboard sediment well 128. With the fryer set up in the high ramp $116^H$ configuration, the fryer 100 is further modified by the temporary installation of a convertible incline panel 150. The convertible incline panel 150 is shaped and arranged to allow quick connection into its installed position as shown in FIG. 4a, as well as quick disconnection and removal to a non-use, storage position (not shown). In the use or installed position, the convertible incline panel 150 provides a bottom wall for the conveyor's return run $110^2$ to scrape across. This allows the return run $110^2$ to transport sediment and oil for ejection into the outboard sediment-removal well 128.

Certainly the heavier-than-oil content of the sediment load is thus ejected into the outboard sediment well 128. Indeed, the entire sediment load is likely ejected into the outboard sediment well 128. The outboard sediment well 128 affords a better chance of filtering or skimming out suspended or floating sediment particles because the partition 130 creates a barrier preventing re-entry into the cooking channel 122 except by a route through the filter 148. Like the inboard sediment well 126, the outboard sediment well 128 has its own flight conveyor 152. FIG. 4b shows that the outboard flight conveyor 152 has a scrape run $152^1$ scraping over a bottom 156 for the outboard sediment well 128. The outboard scrape run $152^1$ pushes its load into an outboard sump 158. The outboard sump 158 has a drain connected to the pump 146 which again discharges to the filter facility 148 for filtration of the cooking oil 118. After filtration, the cooking oil 118 is re-circulated back into the fryer 100 where it can get into the cooking channel 122.

The foregoing provides advantages in extending the use life of the cooking oil 118 by enhancing the ability to more cleanly filter the cooking oil. Lessening the cooking oil's sediment load as well its residence time in the cooking channel 122 lengthens the use life of a given batch of cooking oil 118. Extending the use life of a given batch of cooking oil extends the run-time of the fryer 100 between episodes of down-time when the cooking oil 118 must be changed out.

FIG. 5 shows improvements for the inventive fryer 100'. These improvements relates to a pair of opposite flanking overflow gutters 153. These gutters flank 153 the cooking channel 122 near the intake end of the fryer 100' for only that much of the main conveyor 110 which comprises the ramp section 116$^L$. More generally, the gutters 153 extend flanking the cooking channel 122 from terminations in the outboard sediment well 128 to origins somewhere approximately near the pivot axis 130 for the ramp section 116$^L$, The overflow gutters 153 are especially advantageous when the ramp section 116$^L$ is configured in the low position, as for the intake of battered products (not shown) which are simply plunged into the oil bath at the intake end of the cooking channel 122. Experience teaches that battered food product dropped into the oil bath this way loses some of its batter coating in free floating globules (not shown). Such globules coalesce into rafts "R" that build up along the flanking sides of the ascending ramp section 116$^L$ where it changes into main level section 114. In FIG. 5, such rafts are indicated as "R."

In accordance with the improvements of FIG. 5, the broken away globules are allowed escape or overflow into the flanking gutters 153. The gutters 153 are provided with flight conveyors 154 that convey and deposit the spillover globules or whatever in the direction of arrows 155 into the outboard sediment well 128. The outboard flight conveyor 152 and/or the suction through the outboard sump 158 are cooperatively relied on to motivate these floating globules or whatever spillover may come into the gutters 153 and outboard well 128, in the direction of arrows 157. Once the globules or whatever sediment and other extraneous matter is moved to the sump 128, it and all the oil along with are processed through the filtration system (although not shown in FIG. 5, see FIG. 4a and the filtration system 148 and the description of it given previously above). The foregoing arrangement of spillover gutters 153 in combination with the outboard sediment well 128 and sump 158 cooperatively deters or eliminates the build up of such rafts "R," and better manages the problem of unwanted extraneous matter or debris in the cooking channel 122.

To accomplish the foregoing, the interior walls 159 of the gutters 153 rise up and terminate at preferably the same elevation as the upper termination of the partition 130 separating the outboard and inboard sediment wells 128 and 126, respectively (although this common elevation and the distinction that is lower than the rest of the walls enclosing the oil bath is not directly discernible given the plan view of FIG. 5). The inboard sediment well 126, although mostly hidden from view and thus shown by hidden lines, can be reckoned because it is serviced by the inboard flight conveyor 136 and inboard sump 144.

FIG. 9a is directed to a further improvement in the inventive fryer 100. By way of background, FIG. 7 shows an arrangement 162 of rectangular heat exchanger tubes 124 in a fryer cooking channel 122. FIG. 6 is a birds-eye detail view of a typical wire mesh conveyor belt 120. In use, the wire mesh belt 120 is preferably formed into an endless conveyor. As shown by FIG. 8, the belt conveyor as a main food-carrying run 110$^1$ that scrapes on the upper broad sides 124$^1$ presented by the tubes 124. The belt conveyor also has a lower or sediment-transporting run 110$^2$ which passes underneath the tubes 124, preferably as scraping along the bottom wall 134 of the cooking channel 122.

FIG. 6 shows that the wire mesh belt 120 preferred for the fryer preferably has these characteristics. The axial dimension or length of the belt is produced by a series of successive wires 164. Each wire 164 extends the lateral width or span of the belt, as from one side edge to the other. Any given wire 164 is formed with a series of U-shaped loops, and such a given wire 164 is woven around its preceding neighbor in an interwoven pattern as shown. Likewise, the given wire 164's trailing neighbor wire is comparably formed with corresponding U-shaped loops and is woven around the given wire 164 in the same fashion. The weave pattern is carried on to the extent necessary to produce a belt in the widths and lengths desired.

These woven wire belts 120 are desirable for many reasons. Among them, these belts 120 provide greater than 85% open area. This allows fairly unrestricted cooking oil contact with the food product. It also facilitates wash down and inspection. They are lightweight and don't demand much drive power. Also, they turn tight circumferences around small transfer rollers to ensure gentle handling and smooth transfer of various products. These belts 120 can be produced in about any width, with commercially available sources providing standardized widths available off-the-shelf as anywhere between about four inches (0.1 m) and twelve feet (3.7 m). Needless to say, these belts 120 can be produced in indefinitely long lengths.

However, one aspect of these belts 120 is that they show an axially extending seam 166 at given intervals across the lateral width or span of the belt 120. These seams 166 are typically oriented internally. These seams 166 represent the continuous string of intersections of the weave of a given wire 164 with its preceding neighbor (eg., the trailing intersection being characterized by the weave of the trailing neighbor with the given wire 164).

FIG. 8 is a transverse section view of the FIG. 7 prototype arrangement 162 of rectangular heat exchange tubes 124 in the cooking channel 122. The tubes 124 are disposed to present one of their broad sides 124$^1$ to the food-carrying run 110$^1$. That is, the food-carrying run 110$^1$ scrapes across their upper broad sides 124$^1$. The return run 110$^2$ scrapes on the bottom wall 134 of the cooking channel 122 and passes closely underneath the heat exchanger tubes 124. The hoped-for result was to allow for a more shallow cooking oil depth in the cooking channel 122.

What was found was this:—that the FIGS. 7,8 arrangement 162 did not provide a satisfactory heat load. Simply, the cooking oil often got too cold. The food product could not be run through at desired rates of throughput (as measured in pounds per hour). In use, needless to say, the cooking product draws heat from the hot cooking oil, which withdrawn-heat is refurnished by the heat exchanger tubes 124. The rate at which the heat exchanger tubes 124 can refurnish the withdrawn heat is dependent on several factors. Among others, the rate at which the heat exchanger tubes 124 can refurnish the withdrawn heat is proportional to surface area of the tubes 124.

In other words, the heat duty of the fryer or fryer system can be thought of as a simple power cycle. The tubes 124 supply heat power to the cooking oil. The cooking product depletes the oil of its heat. The tubes 124 re-supply the heat-depleted cooking oil with more heat, which is continually being withdrawn by the cooking product. Accordingly, if the heat exchangers 124 can only manage to input heat power into the system at a trickle, only a trickle of food product can be adequately cooked. On the other hand, if the heat exchangers 124 can flood the system with heat power, then the system can adequately cook much higher throughput rates of food product.

It was also discovered that, with the FIGS. 7/8 arrangement 162, the belt seams 166 tended to fill the gaps 168 between the tubes 124. This hindered sediment removal in various ways, including that it did not allow sediment much clearance to fall through to the sediment-transporting run $110^2$. In sum, it was noticed that the heat-exchange and/or sediment-removal qualities of this arrangement 162 system invited improvement.

The FIG. 8 proto-type arrangement 162 preceded the inventive arrangement 170 shown by FIG. 9a. In FIG. 9a, the rectangular tubes 124 are arranged side by side—that is, broad side $124^1$ next to broad side $124^1$—with gaps 172 other than the gaps 168 at the seams 166 to increase heat transfer surface area. The tubes 124 are hence stood on their narrow sides $124^2$. The upper narrow sides $124^2$ are arranged on a uniform level to present a supporting or scrape surface for the food-carrying run $110^1$ of the main belt. By way of non-limiting example, the FIG. 9a arrangement 170 shows that every third and fourth tube are spaced by a gap 168 sufficient to accommodate the belt seam 166 traveling therethrough. The other gaps 172 as between the first and second tubes and the second and third tubes allow clearance for the fall through of sediment. The sediment can be transported out of the cooking channel 122 by the sediment-transporting run $110^2$ below, which preferably discharges into one of the two versions of sediment wells 126/128 as shown by FIG. 4a (or FIG. 4b).

Hence, FIG. 9a shows an improved heat exchanger arrangement 170. The total number of tubes 124 included is increased, at least in this example, threefold. The heat transfer surface area is likewise increased three fold. Additional gaps 172 are provided other than those gaps 168 giving clearance to the belt seams 166. The other gaps 172 not only allow clearance for falling sediment but also, improve cooking oil swirling and eddying across the tube broad faces $124^1$. The improved cooking-oil swirling or eddying across the tube broad faces $124^1$ affords more efficient heat exchange by improving the heat transfer factor or coefficient. At the same time, the FIG. 9a arrangement 170 affords a significantly shallow cooking channel to minimize the quantity of cooking oil needed to charge the fryer.

FIG. 9b shows an alternate version 171 of the FIG. 9a arrangement 170. In FIG. 9b, the heat exchanger tubes 174 are more compact versions of the tubes 124 in FIG. 9a. Nevertheless, the tubes 174 are arranged to preserve the belt-seam gaps 168 for clearance of the belt seams 166 as they travel axially therethrough. Also, the tubes 174 are arranged to provide at least one or more other gaps 172 intermediate the belt-seam gaps 168 to facilitate downward communication of sediment from the food-carrying run $110^1$ to the sediment transporting run $110^2$ below.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A hot oil fryer for continuous frying duty in continuous food process lines, comprising:
    a cooking channel having a bottom wall between spaced sidewalls and spaced end walls for containing cooking oil to a given fill level;
    a conveyor belt having an upper food-carrying run and a lower sediment-motivating run, which sediment-motivating run is disposed to traverse along the cooking channel bottom wall for motivating sediment in direction of one end of the cooking channel;
    wherein the conveyor belt is disposed in the cooking channel such that a majority of both runs can be sunk below the given fill level of the cooking oil;
    a bed of rectangular or square heat exchanger tubes arranged in spaced rows that extend parallel to the runs of the conveyor, wherein in cases of rectangular tubes each is disposed upright with the narrow sides being top and bottom and the broad sides being vertical, and wherein said bed of heat exchanger tubes is interposed between the conveyor belt's upper and lower runs such that the top sides of the tubes cooperatively support the upper food-carrying run against sagging and also cut-down the span between the source of heat flowing inside the heat exchanger tubes and the sink of heat in the food product that is transported on the food-carrying run; and
    a heat input system for servicing the heat exchanger tubes with a heat medium.

2. The fryer of claim 1 wherein the conveyor belt comprises an open mesh belt having a pattern that presents a series of spaced seams; and
    wherein the heat exchanger tubes are sized and arranged in the bed such that some gaps between adjacent tubes accommodate the sliding transit of the seams therealong as other gaps do not and thereby afford clearance for sediment sinking from the upper food-carrying run to the lower sediment-motivating run.

3. The fryer of claim 1 further comprising a cooking oil filtration system which interfaces with the cooking channel at least by an intake associated with the cooking channel's said one end.

4. The fryer of claim 1 further comprising a submerger system disposed directly above the conveyor belt's food-carrying run in order to submerge food product below the given fill level of the cooking oil during transit through the cooking channel.

5. The fryer of claim 1 further comprising a drive input system for driving the conveyor.

6. A hot oil fryer for continuous frying duty in continuous food process lines, comprising:
    a cooking channel having a bottom wall between spaced sidewalls and spaced end walls for containing cooking oil to a given fill level, wherein the bottom wall deepens at one of said ends to define an intake end and is formed with a pair of debris collection wells which are partitioned by a transverse wall into an inboard debris collection well and an outboard debris collection well;
    a conveyor system having an upper food-carrying run and a lower sediment-motivating run, which sediment-motivating run is generally disposed to traverse along the cooking channel bottom wall for motivating sediment in the direction of the intake end of the cooking channel;
    said conveyor system including an entrant ramp section that is operative in the intake end's inboard debris collection well at least alternatively between a high-ramp configuration and a low-ramp configuration;
    wherein the conveyor system, excluding the entrant ramp section if in the high-ramp configuration, is disposed in the cooking channel such that both runs can be sunk below the given fill level of the cooking oil; and
    wherein the lower sediment-motivating run of the entrant ramp section motivates debris into the outboard well if in the high-ramp configuration or else into the inboard well if in the low-ramp position.

7. The fryer of claim 6 further comprising a convertible incline panel, for removable placement underneath the entrant section's lower sediment-motivating run when in the high-ramp configuration, extending from an origin about where the cooking channel deepens to a termination in or over the outboard debris collection well, wherein said convertible incline panel provides support against sagging to the entrant section's lower sediment-motivating run as well as affords the transit of sediment thereacross until ejected over the termination that is in or over the outboard debris collection well.

8. The fryer of claim 6 wherein the sidewalls of the cooking channel where flanking the deepened portion of the cooking channel's bottom wall are formed low as about even with the given fill level of the cooking oil and provided with gutters that afford the spillover and removal of debris.

9. The fryer of claim 8 wherein the gutters drain into the outboard debris collection well.

10. The fryer of claim 6 wherein the transverse partition wall has an upper edge that generally corresponds to the given fill level of the cooking oil.

11. The fryer of claim 10 wherein the outboard debris collection well comprises a relatively shallow gutter attached to the transverse partition wall's upper edge.

12. The fryer of claim 6 further comprising a cooking oil filtration system which interfaces with at least the inboard and outboard debris collection wells.

13. The fryer of claim 6 further comprising a submerger system disposed directly above the conveyor's food-carrying run in order to submerge food product below the given fill level of the cooking oil during transit through the cooking channel.

14. The fryer of claim 6 further comprising a heat input system for servicing the cooking oil with heat input and a drive input system for driving the conveyor system.

15. A hot oil fryer for continuous frying duty in continuous food process lines, comprising:

a cooking channel having a bottom wall between spaced sidewalls and spaced end walls for containing cooking oil to a given fill level, wherein the bottom wall deepens at one of said ends to define a plunge pool for the intake of dropped-in food product; and a conveyor system having an upper food-carrying run and a lower return run, wherein the conveyor system includes an entrant ramp section such that the food-carrying run of the entrant ramp section climbs out of the plunge pool and then levels off;

wherein the sidewalls of the cooking channel where flanking the plunge pool are formed low as about even with the given fill level of the cooking oil and are there provided with gutters that afford the spillover and removal of debris.

16. The fryer of claim 15 wherein the end wall of the cooking channel which is at the plunge pool end has an upper edge that generally corresponds to the given fill level of the cooking oil, which upper edge is provided with a transverse gutter that extends between the sidewall gutters.

17. The fryer of claim 15 further comprising a cooking oil filtration system which interfaces with at least the gutters.

18. The fryer of claim 15 further comprising a submerger system disposed directly above the conveyor's food-carrying run in order to submerge food product below the given fill level of the cooking oil during transit through the cooking channel.

19. The fryer of claim 15 further comprising a heat input system for servicing the cooking oil with heat input and a drive input system for driving the conveyor system.

* * * * *